United States Patent
Nakao

(10) Patent No.: US 7,398,098 B2
(45) Date of Patent: Jul. 8, 2008

(54) RADIO BASE APPARATUS, TRANSMISSION POWER CONTROL METHOD, AND TRANSMISSION POWER CONTROL PROGRAM

(75) Inventor: Seigo Nakao, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1061 days.

(21) Appl. No.: 10/487,541

(22) PCT Filed: Aug. 12, 2002

(86) PCT No.: PCT/JP02/08232

§ 371 (c)(1),
(2), (4) Date: Feb. 24, 2004

(87) PCT Pub. No.: WO03/019818

PCT Pub. Date: Mar. 6, 2003

(65) Prior Publication Data
US 2004/0235511 A1    Nov. 25, 2004

(30) Foreign Application Priority Data
Aug. 24, 2001    (JP)    .............................. 2001-254639

(51) Int. Cl.
*H04B 7/04*    (2006.01)
(52) U.S. Cl. .................... 455/522; 455/561; 455/67.14; 455/277.2
(58) Field of Classification Search ................. 455/522, 455/67.11, 67.14, 561, 562.1, 272, 277.1, 455/277.2
See application file for complete search history.

(56) References Cited

U.S. PATENT DOCUMENTS

| 5,239,541 A | 8/1993 | Murai |
| 6,847,810 B2 * | 1/2005 | Shen et al. ................ 455/277.2 |
| 7,139,324 B1 * | 11/2006 | Ylitalo et al. .......... 455/67.14 X |

FOREIGN PATENT DOCUMENTS

| EP | 1 014 599 | 6/2000 |
| JP | 3-226124 | 10/1991 |
| JP | P2000-22611 | 1/2000 |
| JP | P2000-106539 | 4/2000 |

OTHER PUBLICATIONS

Nobuyoshi Kikuma, "Adaptive Signal Processing by Array Antenna", *Kagaku Gijutsu Shuppan*, pp. 35-49, Nov. 1998.

* cited by examiner

*Primary Examiner*—Philip J. Sobutka
(74) *Attorney, Agent, or Firm*—McDermott Will & Emery LLP

(57) ABSTRACT

In a mobile communication system having a plurality of terminals including a diversity terminal, an adaptive array base station controls a down-link transmitting power waveform for a terminal establishing access such that transmitting power is decreased at a timing when a reception level of a chip antenna is measured and that transmitting power is increased at a timing when a reception level of a whip antenna as a transmission antenna is measured. In the diversity terminal, therefore, the whip antenna is more likely to be selected as a receiving antenna, thereby improving down-link reception performance.

21 Claims, 9 Drawing Sheets

RADIO BASE APPARATUS, TRANSMISSION POWER CONTROL METHOD, AND TRANSMISSION POWER CONTROL PROGRAM

TECHNICAL FIELD

The present invention relates to a radio base apparatus, a transmitting power control method and a transmitting power control program, and more particularly to a radio base apparatus, a transmitting power control method and a transmitting power control program with improved reception performance of a down-link signal in a diversity terminal in a mobile communication system where a plurality of terminals including a diversity terminal communicate with an adaptive array radio base apparatus.

BACKGROUND ART

Recently, in rapidly growing mobile communication systems (for example, Personal Handyphone System, abbreviated as PHS hereinafter), a PDMA (Path Division Multiple Access) scheme is proposed where path division multiple access is established between radio terminal devices (terminals) of a plurality of users and a radio base station (base station) by spatially dividing the same time slot at the same frequency in order to increase the frequency utilization efficiency of radio waves.

In this PDMA scheme, the adaptive array technique is employed at present where an up-link signal from an antenna of each user terminal is received by an array antenna at a base station and separated and extracted with reception directivity through adaptive array processing. On the other hand, a down-link signal from the base station to the terminal is transmitted from the array antenna with transmission directivity to the antenna of the terminal.

Such adaptive array processing is a well-known technique and described in detail, for example, in "Adaptive Signal Processing by Array Antenna" by Nobuyoshi Kikuma (Kagaku Gijutsu Shuppan,) chapter 3, MMSE Adaptive Array, pp 35 to 49, and therefore the description of the operation principle will not be made here.

It is noted that in the following description, a base station performing down-link transmission directivity control for a terminal using such adaptive array processing will be referred to as an adaptive array base station.

On the other hand, such a terminal is known that performs selective diversity reception (diversity reception, hereinafter) using a plurality of antennas. As such a terminal, a terminal including two antennas called a whip antenna and a chip antenna is common, which will be referred to as a diversity terminal hereinafter. Furthermore, a terminal with one antenna that does not perform diversity reception will be referred to as a normal terminal.

This diversity terminal normally operates to fix one antenna (generally a whip antenna) as a transmission antenna at the time of transmission and to select one of the whip antenna and the chip antenna which has a higher reception level as a reception antenna at the time of reception.

Such a conventional diversity terminal carries out the aforementioned diversity reception irrespective of whether a base station of the other party for access is an adaptive array base station performing transmission directivity control or a non-directional base station.

FIG. 9 is a diagram schematically showing an exemplary connected state between a terminal and a base station, and more particularly a diagram schematically showing path division multiple access from a diversity terminal and a normal terminal to an adaptive array base station through adaptive array processing.

Referring to FIG. 9, a diversity terminal 2 transmits an up-link signal with a whip antenna 2a fixed as a transmission antenna at the time of transmission, and an adaptive array base station 1 receives this signal with an array antenna 1a.

On the other hand, a normal terminal 3 transmits an up-link signal with one antenna 3a at the time of transmission, and adaptive array base station 1 receives this signal with array antenna 1a.

In response, adaptive array base station 1 transmits a down-link signal to diversity terminal 2 with directivity (which corresponds to a transmitting power level) indicated by the solid line, and transmits a down-link signal to normal terminal 3 with directivity (which corresponds to a transmitting power level) indicated by the broken line.

The transmission directivity for diversity terminal 2 is such that a beam is directed to whip antenna 2a of diversity terminal 2 that has transmitted the up-link signal and null is directed to antenna 3a of normal terminal 3 that is an interference source.

On the other hand, the transmission directivity for normal terminal 3 is such that a beam is directed to antenna 3a of normal terminal 3 that has transmitted the up-link signal and null is directed to whip antenna 2a of diversity terminal 2 that is an interference source.

As a result, the signal received at antenna 3a of normal terminal 3 is a signal with a small interference component, that is, with a so-called DU (Desired user's power: Undesired user's power) ratio being high, where the down-link signal level (the solid line) from adaptive array base station 1 to diversity terminal 2 is relatively small with respect to the down-link signal level (the broken line) from adaptive array base station 1 to normal terminal 3.

The signal received at whip antenna 2a of diversity terminal 2 is also a signal with a high DU ratio where the down-link signal level (the broken line) from adaptive array base station 1 to normal terminal 3 is relatively small with respect to the down-link signal level (the solid line) from adaptive array base station 1 to diversity terminal 2.

As described above, the diversity terminal operates to fix the whip antenna as a transmission antenna at the time of transmission and to select one of the whip antenna and the chip antenna which has a higher reception level as a reception antenna at the time of reception.

Here, with reference to chip antenna 2b of diversity terminal 2, this antenna is not used to transmit the up-link signal, and the null of the transmission directivity (the broken line) for normal terminal 3 is not directed.

Therefore chip antenna 2b of diversity terminal 2 receives the transmitting power (the broken line) for normal terminal 3 in addition to the transmitting power (the solid line) for diversity terminal 2. As a result, there is a possibility that the reception level in chip antenna 2b may exceed the reception level at whip antenna 2a, resulting in that chip antenna 2b may be selected as a receiving antenna.

If chip antenna 2b is selected as a receiving antenna, the down-link signal level (the broken line) from adaptive array base station 1 to normal terminal 3 becomes relatively large with respect to the down-link signal level (the solid line) from adaptive array base station 1 to diversity terminal 2, resulting in a signal with a large interference component and a low DU ratio.

Even if such a received signal with a low DU ratio is demodulated in diversity terminal 2, the frame of the demodulated signal will suffer from an error to prevent accurate demodulation.

As described above, in the conventional mobile communication system where a plurality of terminals including a diversity terminal establish access to an adaptive array base station, a down-link received signal at the diversity terminal has a reduced DU ratio and the reception performance is deteriorated because of interference wave. As a result, the diversity terminal will not be able to maintain path division multiple access.

An object of the present invention is therefore to provide a radio base apparatus, a transmitting power control method and a transmitting power control program, free from deteriorated reception performance in a diversity terminal, in a mobile communication system where a plurality of terminals including a diversity terminal establish access to an adaptive array base station.

DISCLOSURE OF THE INVENTION

In accordance with one aspect, the present invention provides a radio base apparatus capable of communicating with a diversity terminal apparatus performing selective diversity reception. The diversity terminal apparatus has at least first and second antennas, always uses the second antenna to transmit an up-link signal to the radio base apparatus, and measures reception levels at the first antenna at a prescribed first timing and at the second antenna at a prescribed second timing of a down-link signal from the radio base apparatus to use an antenna with a higher reception level to receive a down-link signal from the radio base apparatus. The radio base apparatus includes signal processing means and transmitting power control means. The signal processing means receives and transmits a signal from/to each of the plurality of terminal apparatuses through adaptive array processing. The transmitting power control means controls transmitting power for a terminal apparatus of the plurality of terminal apparatuses which communicates with the radio base apparatus such that transmitting power at the second timing of the down-link signal is larger than transmitting power at the first timing of the down-link signal.

Preferably, the transmitting power control means controls transmitting power such that transmitting power at the first timing is decreased and transmitting power at the second timing is increased, of a down-link signal to a terminal communicating with the radio base apparatus.

Preferably, the transmitting power control means controls transmitting power such that transmitting power at the first timing of a down-link signal to a terminal communicating with the radio base apparatus is decreased.

Preferably, the transmitting power control means controls transmitting power such that transmitting power at the second timing of a down-link signal to a terminal communicating with the radio base apparatus is increased.

Preferably, the transmitting power control means controls transmitting power such that when the first timing of a down-link signal to a first terminal communicating with the radio base apparatus overlaps the second timing of a down-link signal to a second terminal communicating with the radio base apparatus, transmitting power at the second timing of the down-link signal to the first terminal is increased and transmitting power at the first timing of the down-link signal to the second terminal is decreased.

Preferably, the transmitting power control means controls transmitting power such that transmitting power of a down-link signal to a second terminal communicating with the radio base apparatus is decreased at the first timing of a down-link signal to a first terminal communicating with the radio base apparatus.

Preferably, the transmitting power control means controls transmitting power such that transmitting power of a down-link signal to a second terminal communicating with the radio base apparatus is increased at the second timing of a down-link signal to a first terminal communicating with the radio base apparatus.

In accordance with another aspect, the present invention provides a transmitting power control method of a radio base apparatus capable of communicating with a diversity terminal apparatus performing selective diversity reception. The diversity terminal apparatus has at least first and second antennas, always uses the second antenna to transmit an up-link signal to the radio base apparatus, and measures reception levels at the first antenna at a prescribed first timing and at the second antenna at a prescribed second timing of a down-link signal from the radio base apparatus to use an antenna with a higher reception level to receive a down-link signal from the radio base apparatus. The transmitting power control method includes the steps of: receiving and transmitting a signal from/to each of the plurality of terminal apparatuses through adaptive array processing; and controlling transmitting power for a terminal apparatus of the plurality of terminal apparatuses which communicates with the radio base apparatus such that transmitting power at the second timing of the down-link signal is larger than transmitting power at the first timing of the down-link signal.

Preferably, the step of controlling transmitting power includes a step of controlling transmitting power such that transmitting power at the first timing is decreased and transmitting power at the second timing is increased, of a down-link signal to a terminal communicating with the radio base apparatus.

Preferably, the step of controlling transmitting power includes a step of controlling transmitting power such that transmitting power at the first timing of a down-link signal to a terminal communicating with the radio base apparatus is decreased.

Preferably, the step of controlling transmitting power includes a step of controlling transmitting power such that transmitting power at the second timing of a down-link signal to a terminal communicating with the radio base apparatus is increased.

Preferably, the step of controlling transmitting power includes a step of controlling transmitting power such that when the first timing of a down-link signal to a first terminal communicating with the radio base apparatus overlaps the second timing of a down-link signal to a second terminal communicating with the radio base apparatus, transmitting power at the second timing of the down-link signal to the first terminal is increased and transmitting power at the first timing of the down-link signal to the second terminal is decreased.

Preferably, the step of controlling transmitting power includes a step of controlling transmitting power such that transmitting power of a down-link signal to a second terminal communicating with the radio base apparatus is decreased at the first timing of a down-link signal to a first terminal communicating with the radio base apparatus.

Preferably, the step of controlling transmitting power includes a step of controlling transmitting power such that transmitting power of a down-link signal to a second terminal communicating with the radio base apparatus is increased at the second timing of a down-link signal to a first terminal communicating with the radio base station.

In accordance with a further aspect, the present invention provides a transmitting power control program of a radio base apparatus capable of communicating with a diversity terminal apparatus performing selective diversity reception. The diversity terminal apparatus has at least first and second antennas, always uses the second antenna to transmit an up-link signal to the radio base apparatus, and measures reception levels at the first antenna at a prescribed first timing and at the second antenna at a prescribed second timing of a down-link signal from the radio base apparatus to use an antenna with a higher reception level to receive a down-link signal from the radio base apparatus. The transmitting power control program causes a computer to execute the steps of: receiving and transmitting a signal from/to each of the plurality of terminal apparatuses through adaptive array processing; and controlling transmitting power for a terminal apparatus of the plurality of terminal apparatuses which communicates with the radio base apparatus such that transmitting power at the second timing of the down-link signal is larger than transmitting power at the first timing of the down-link signal.

Preferably, the step of controlling transmitting power includes a step of controlling transmitting power such that transmitting power at the first timing is decreased and transmitting power at the second timing is increased, of a down-link signal to a terminal communicating with the radio base apparatus.

Preferably, the step of controlling transmitting power includes a step of controlling transmitting power such that transmitting power at the first timing of a down-link signal to a terminal communicating with the radio base apparatus is decreased.

Preferably, the step of controlling transmitting power includes a step of controlling transmitting power such that transmitting power at the second timing of a down-link signal to a terminal communicating with the radio base apparatus is increased.

Preferably, the step of controlling transmitting power includes a step of controlling transmitting power such that when the first timing of a down-link signal to a first terminal communicating with the radio base apparatus overlaps the second timing of a down-link signal to a second terminal communicating with the radio base apparatus, transmitting power at the second timing of the down-link signal to the first terminal is increased and transmitting power at the first timing of the down-link signal to the second terminal is decreased.

Preferably, the step of controlling transmitting power includes a step of controlling transmitting power such that transmitting power of a down-link signal to a second terminal communicating with the radio base apparatus is decreased at the first timing of a down-link signal to a first terminal communicating with the radio base apparatus.

Preferably, the step of controlling transmitting power includes a step of controlling transmitting power such that transmitting power of a down-link signal to a second terminal communicating with the radio base apparatus is increased at the second timing of a down-link signal to a first terminal communicating with the radio base apparatus.

In accordance with the present invention, the down-link transmitting power waveform from the radio base apparatus is controlled in step with the down-link signal level measurement timing for the selective diversity operation in the diversity terminal apparatus, so that the antenna of the diversity terminal that is used at the time of transmission is more likely to be selected as a receiving antenna, thereby preventing deteriorated reception performance in the diversity terminal.

BEST MODES FOR CARRYING OUT THE INVENTION

Figure 1:
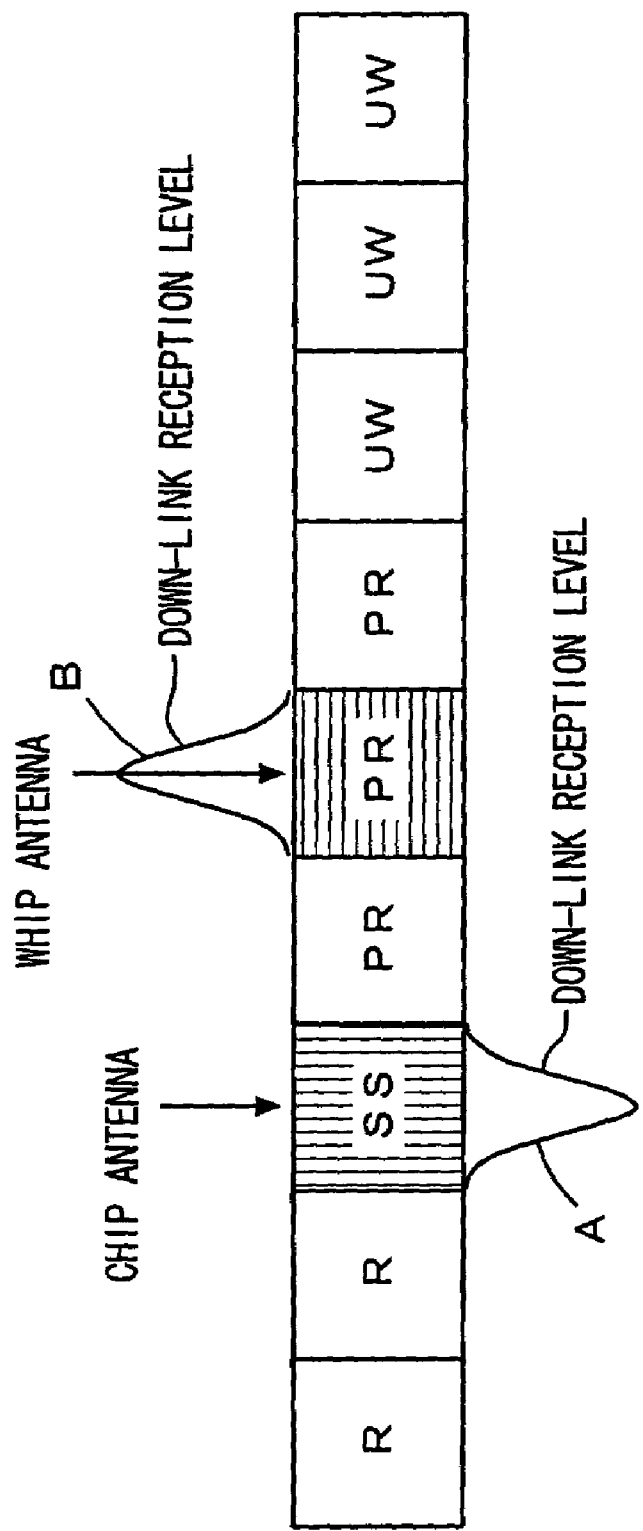
FIG. 1 is a conceptual diagram schematically showing a basic principle of transmitting power control in the present invention.

In the following, an embodiment of the present invention will be described in detail with reference to the figures. It is noted that the same or corresponding parts will be denoted with the same reference characters and the description thereof will not be repeated.

FIG. 1 is a conceptual diagram schematically showing a basic principle of transmitting power control of the present invention.

More particularly, FIG. 1 is a schematic diagram showing a part of a frame format of PHS.

The frame of the transmitting signal of PHS first starts with a two-symbol ramp R, R, followed by one symbol of start symbol SS, three symbols of preamble PR, PR, PR, and eight symbols of unique word UW, UW, UW (note that for convenience of illustration, only three symbols are shown for unique word UW). This is followed by a traffic channel, which is not shown in FIG. 1 as it is not pertinent to the transmitting power control of the present invention.

Turning now to FIG. 1, the selective diversity operation in the diversity terminal will be described. As described above, the diversity terminal selects one of the whip antenna (a transmitting antenna) and the chip antenna which has a higher reception level as a reception antenna at the time of reception.

In the PHS at present, the diversity terminal measures a reception level of the chip antenna at a timing of start symbol SS (the block with vertical strips in FIG. 1) of the down-link signal from the base station and measures a reception level of the whip antenna at a timing of the second symbol of preamble PR (the block with horizontal stripes in FIG. 1).

As a result, if the reception level of the chip antenna is higher, the down-link signal is received at the antenna different from the antenna (the whip antenna) in transmitting the up-link signal, resulting in the problem described above (deteriorated reception performance). On the other hand, if the reception level of the whip antenna is higher, the down-link is received at the same antenna as in transmitting the up-link signal, and thus the aforementioned problem does not occur.

Then, in the present invention, the transmitting power waveform of the down-link signal is controlled at the base station such that the level of the down-link signal is decreased (waveform A) at the timing of SS when the diversity terminal measures the reception level of the chip antenna and that the level of the down-link signal is increased (waveform B) at the timing of the second symbol of PR when the diversity terminal measures the reception level of the whip antenna.

In other words, if the reception level is decreased at the timing of SS and the reception level is increased at the timing of the second symbol of PR, the difference between both reception levels is increased so that the whip antenna is more likely to be selected as a reception antenna.

The amplitude variation of the transmitting power waveform generally has upper and lower limits, and within that range, it is preferable to decrease the transmitting power at the timing of SS and increase the transmitting power at the timing of the second symbol of PR to obtain a large reception level difference effectively, as shown in FIG. 1. It is noted that if the permitted upper or lower limit is high or low enough, the whip antenna is more likely to be selected as an reception antenna either by decreasing the transmitting power by a sufficient magnitude at the timing of SS or by increasing the transmitting power by a sufficient magnitude at the timing of the second symbol of PR.

It is noted that in the adaptive array base station in accordance with the present invention the transmitting power control as shown in FIG. 1 is always carried out irrespective of whether the communicating terminal is a diversity terminal or not.

Furthermore, the transmitting power control shown in FIG. 1 is carried out even when a single user establishes access, that is, irrespective of whether a plurality of users establish path division multiple access to the adaptive array base station. This is because the present invention can prevent deteriorated reception performance of the down-link signal from the adaptive array base station as long as the single user is a diversity terminal, irrespective of the presence or absence of path division multiple access.

Figure 2:
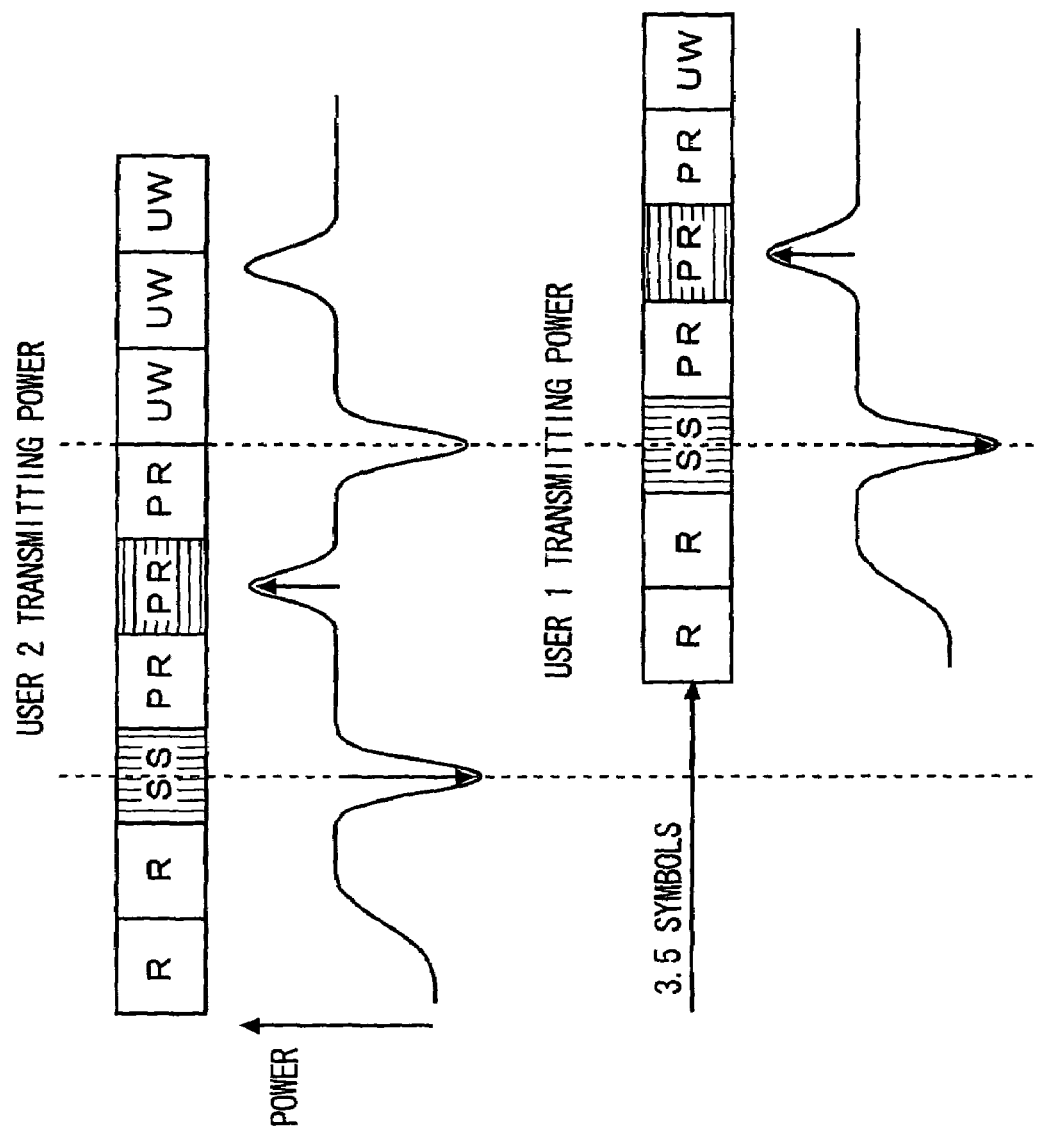
FIG. 2 is a timing chart schematically illustrating an example of the transmitting power control in the present invention where two users establish path division multiple access.

FIG. 2 is a timing chart schematically illustrating an example of transmitting power control that is performed using the principle shown in FIG. 1, where two user terminals (whether they are diversity terminals or not does not matter) establish path division multiple access to the adaptive array base station.

Generally, when the terminals of user 1 and user 2 establish access to the adaptive array base station, the transmission timings from the base station to both of the terminals are shifted from each other (in the example of FIG. 2, the transmission timing of user 1 is delayed by a period of time corresponding to 3.5 symbols from the transmission timing of user 2).

As described above, in the present invention, irrespective of whether each terminal that establishes access is a diversity terminal or not, the base station carries out the transmitting power control shown in FIG. 1 for each terminal.

As is clear from FIG. 2, control is performed with respect to user 2 such that the transmitting power is decreased (the down arrow) at the timing of SS and the transmitting power is increased (the up arrow) at the timing of the second symbol of PR.

Similarly, control is performed with respect to user 1 such that the transmitting power is decreased (the down arrow) at the timing of SS and the transmitting power is increased (the up arrow) at the timing of the second symbol of PR.

It is noted that the timing of SS for user 1 corresponds to the boarder between the third symbol of PR and the first symbol of UW for user 2, which is essentially not a timing for changing the transmitting power. However, the transmitting power of user 2 is preferably also controlled to be decreased at the same timing as user 1, thereby contributing to effective decrease in the reception level of the chip antenna of user 1.

Similarly, the timing of the second symbol of PR for user 1 corresponds to the boarder between the second symbol and the third symbol of UW for user 2, which is not a timing for changing the transmitting power. However, the transmitting power of user 2 is preferably also controlled to be increased at the same timing as user 1, thereby contributing to effective increase in the reception level of the whip antenna of user 1.

Because of the transmitting power control in FIG. 2, the reception level at the whip antenna is higher than the reception level of the chip antenna in both of users 1 and 2, and the whip antenna is more likely to be selected as a receiving antenna.

Figure 3:
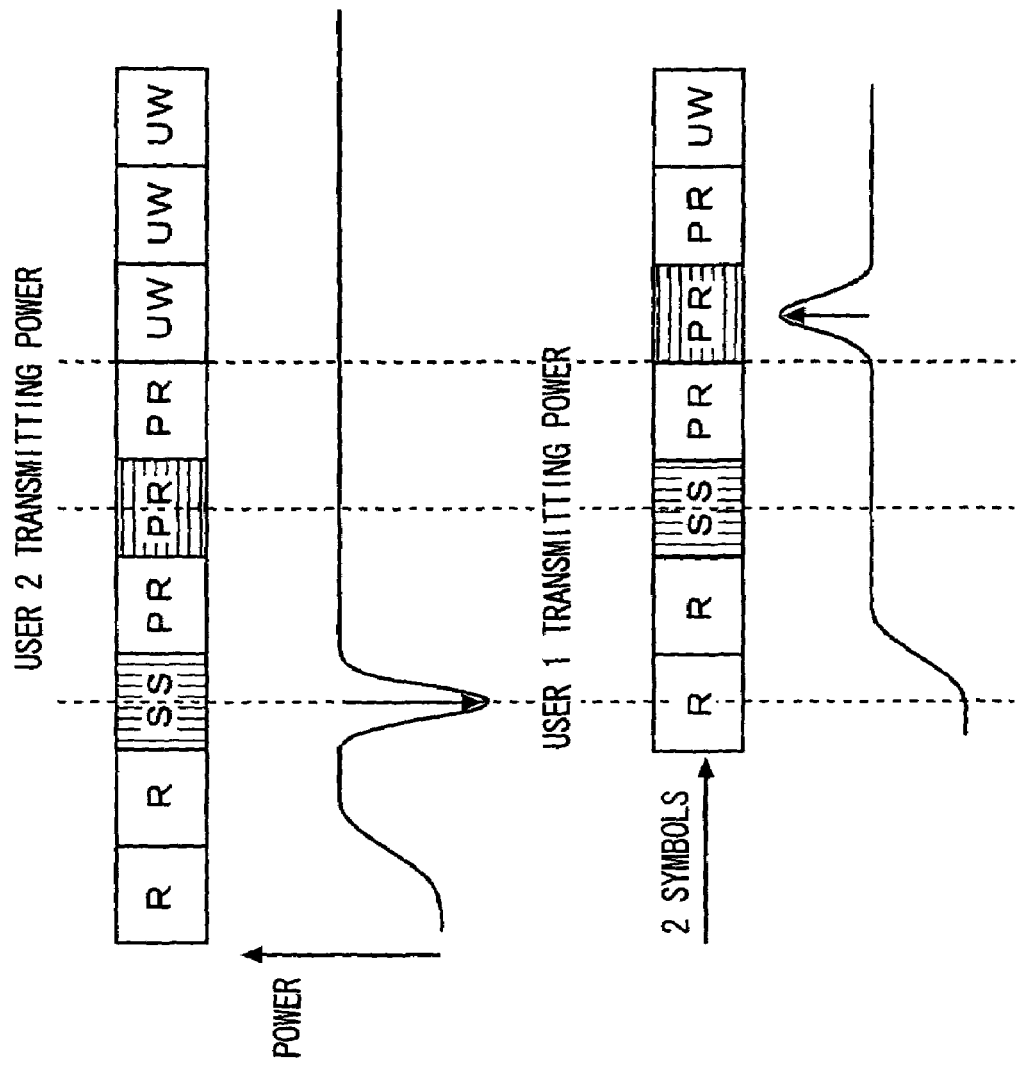
FIG. 3 is a timing chart schematically illustrating another example of the transmitting power control in the present invention where two users establish path division multiple access.

Now, FIG. 3 is a timing chart schematically illustrating another example of the transmitting power control performed using the principle shown in FIG. 1, where two user terminals (whether they are diversity terminals or not does not matter) establish path division multiple access to the adaptive array base station.

In the example of FIG. 3, the transmission timing for user 2 is delayed by two symbols from the transmission timing for user 1. As a result, the timing of SS for user 1, that is, the timing at which the reception level of the chip antenna is measured overlaps the timing of the second symbol of PR for user 2, that is, the timing at which the reception level of the whip antenna is measured.

In this case, at the overlapped timing described above, the control of the transmitting power is not performed in either user 1 or user 2. This is because the changes in the opposite directions affect each other and thus a sufficient effect cannot result. In such a case, a sufficient range is provided for the increase in the transmitting power at the timing of measuring the whip antenna of user 1 (i.e. the second symbol of PR) and for the decrease in the transmitting power at the timing of measuring the chip antenna of user 2 (i.e. SS), so that the whip antenna is more likely to be selected as a receiving antenna.

Figure 4:
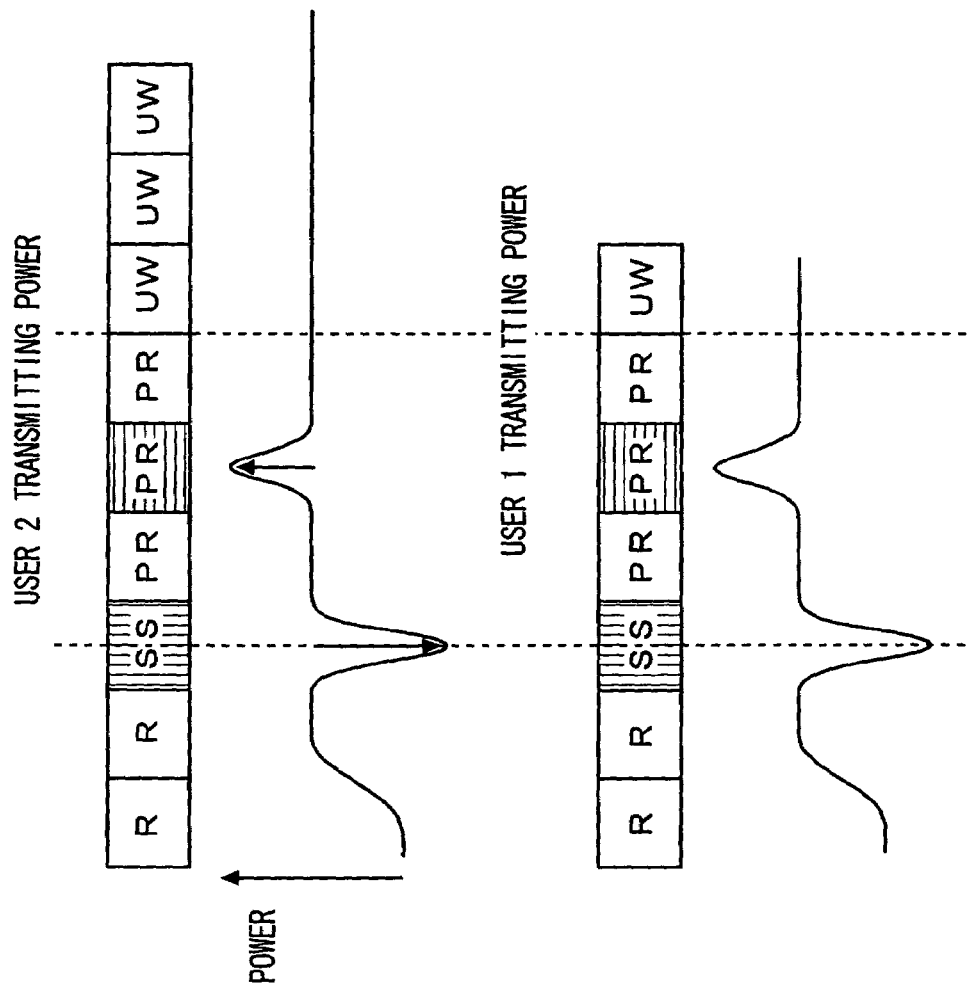
FIG. 4 is a timing chart schematically illustrating a further example of the transmitting power control in the present invention where two users establish path division multiple access.

Next, FIG. 4 is a timing chart schematically illustrating a further example of transmitting power control performed using the principle shown in FIG. 1, where two user terminals (whether they are diversity terminals or not does not matter) establish path division multiple access to the adaptive array base station.

In the example shown in FIG. 4, the transmission timings for users 1 and 2 are the same. In the PHS at present, the transmission timings are shifted from each other as in the example described above. Even if the standard is changed such that the transmission timings for users 1 and 2 can be the same, the whip antenna will be more likely to be selected as the receiving antenna in both users by applying the transmitting power waveform shown in FIG. 1 to each of users 1 and 2.

Figure 5:
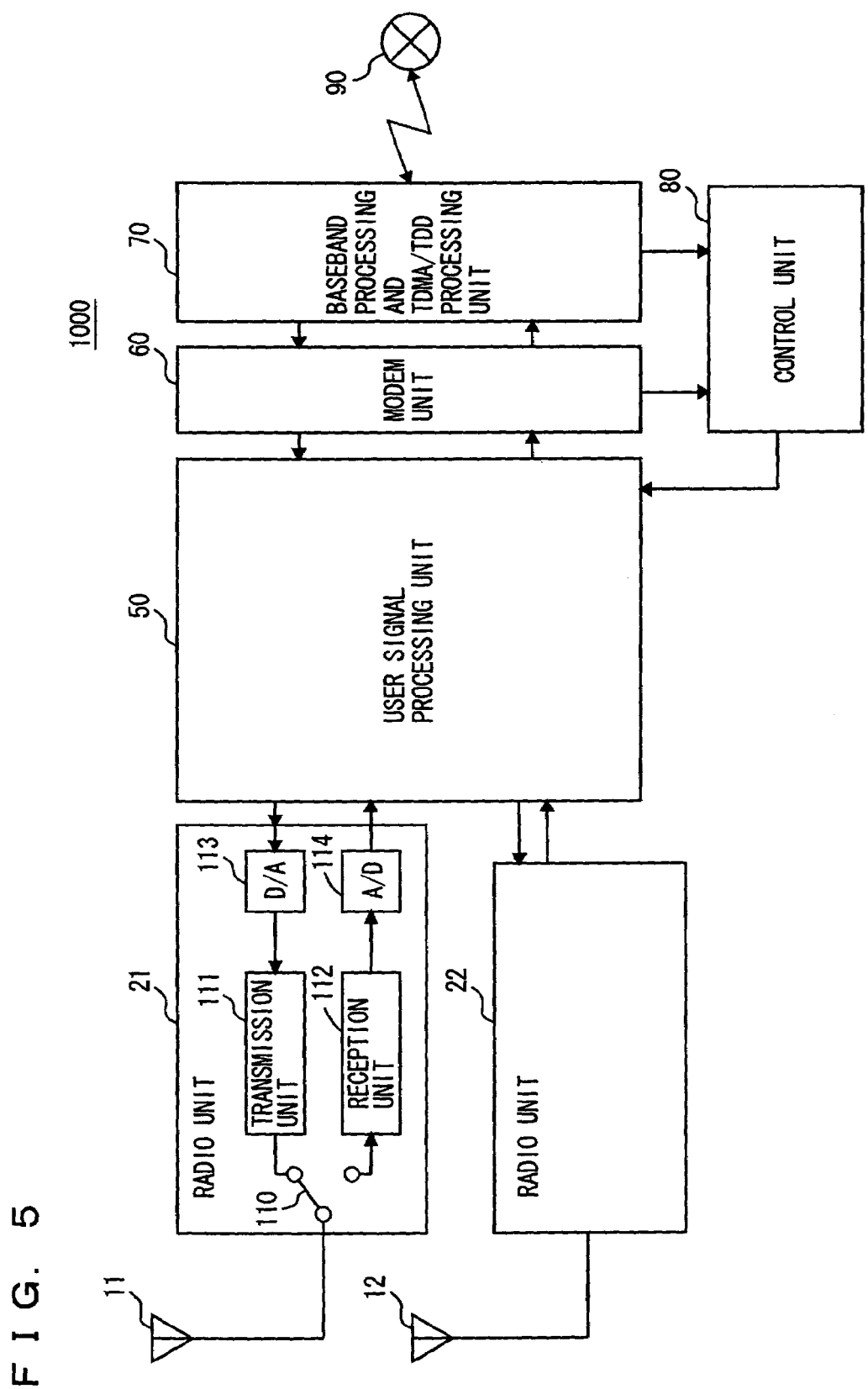
FIG. 5 is a schematic block diagram showing a configuration of an adaptive array base station in accordance with an embodiment of the present invention.

FIG. 5 is a schematic block diagram showing a configuration of adaptive array base station 1000 in accordance with an embodiment of the present invention for performing the transmitting power control illustrated in conjunction with FIGS. 1-4.

Referring to FIG. 5, adaptive array base station 1000 includes a plurality of antennas, for example, antennas 11, 12.

Antennas 11, 12 are connected to radio units 21, 22, respectively. Radio units 21 and 22 have the identical configuration, and only the configuration of radio unit 21 is shown and illustrated.

Radio unit 21 includes a switch 110, a transmission unit 111, a reception unit 112, a D/A converter 113, and an A/D converter 114.

At the time of reception, switch 110 switches to apply a signal received at antenna 11 to reception unit 112. The received signal applied to reception unit 112 is then subjected to a variety of analog signal processing including amplification, frequency conversion and the like, and is converted to a digital signal by A/D converter 114 to be applied to user signal processing unit 50.

User signal processing unit 50 separates and extracts a signal of each user through adaptive array processing described later. The received signal of each user as being separated and extracted is applied to a normal modem unit 60 and a baseband processing and TDMA/TDD processing unit 70 for necessary demodulation and time division processing, and is then restored to the original signal and supplied to a public network 90.

On the other hand, at the time of transmission, a transmitting signal applied from public network 90 is applied to baseband processing and TDMA/TDD processing unit 70 and modem unit 60 for necessary time division and modulation processing to be applied to user signal processing unit 50.

User signal processing unit 50 controls down-link transmission directivity as described later and D/A converter 113 in radio unit 21 performs conversion into an analog signal.

The transmitting signal as being converted into an analog signal is subjected to a variety of analog signal processing including amplification, frequency conversion and the like that is required for radio transmission in transmission unit 111.

At the time of transmission, switch 110 switches to connect transmission unit 111 to antenna 11 so that the transmitting signal subjected to radio processing in transmission unit 111 is transmitted from antenna 11.

The similar processing is also carried out through radio unit 22.

It is noted that adaptive array base station 1000 in FIG. 5 includes a control unit 80, which is the feature of the present invention, where based on the information from modem unit 60 and baseband processing and TDMA/TDD processing unit 70, the transmission timing for each user is determined and the result is provided to user signal processing unit 50. The operation of control unit 80 will be described later.

The process in user signal processing unit 50 and control unit 80 shown in FIG. 5 is actually implemented by software using a digital signal processor (DSP).

Figure 6:
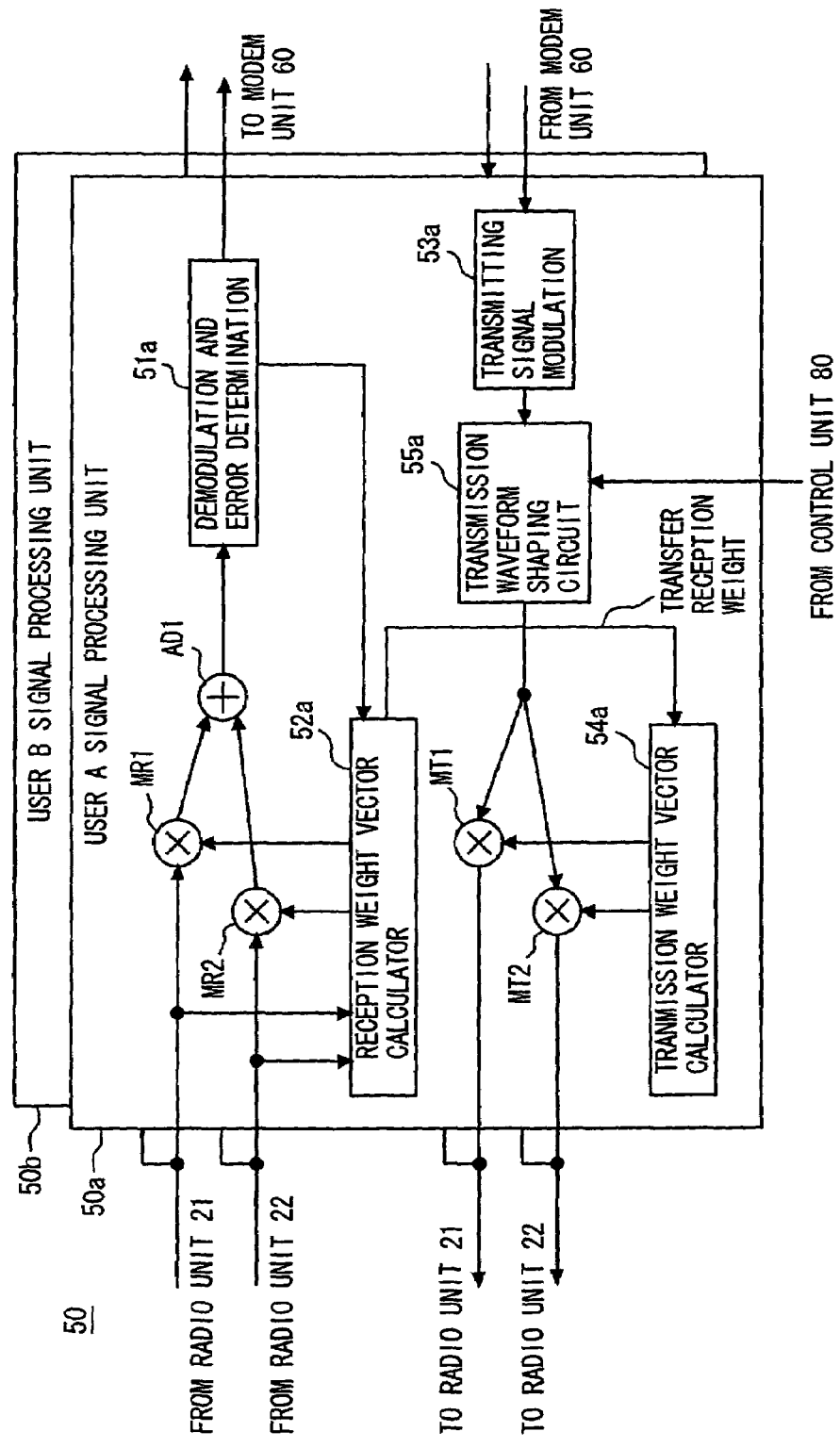
FIG. 6 is a functional block diagram showing a configuration of a user signal processing unit 50 shown in FIG. 5.

FIG. 6 is a functional block diagram showing the configuration of user signal processing unit 50 shown in FIG. 5. User signal processing unit 50 is formed of a user A signal processing unit 50a and a user B signal processing unit b.

User A signal processing unit 50a and user B signal processing unit 50b have the identical configuration, and only the configuration of user A signal processing unit 50a is shown and illustrated.

A digital received signal provided through A/D converter 114 from reception unit 112 of radio unit 21 corresponding to antenna 11 in FIG. 5 and a digital received signal provided through the not-shown A/D converter from the not-shown reception unit of radio unit 22 corresponding to antenna 12 are provided in common to user A signal processing unit 50a and user B signal processing unit 50b.

In the following, the processing of these digital signals applied to user A signal processing unit 50a will be described. The adaptive array processing is performed in a software manner on these signals applied to user A signal processing unit 50a by a not-shown DSP in base station 1000 in accordance with the functional block diagram shown in FIG. 6.

Referring to FIG. 6, the digital received signals in two streams, constituting the received signal vector, provided from radio units 21, 22 to user A signal processing unit 50a are provided to the respective one inputs of multipliers MR1, MR2 and to a reception weight vector calculator 52a.

Reception weight vector calculator 52a uses an adaptive array algorithm described later to calculate a weight vector formed of weights for respective antennas which are provided to respective other inputs of multipliers MR1, MR2 for complex multiplications by the respective received signal weights from the corresponding antennas. An adder AD1 results an array output signal that is a sum of the complex multiplication results.

The array output signal that is the result of the sum of the complex multiplications as described above is demodulated to bit data and determined for error by a demodulation and error determination unit 51a and thereafter supplied to modem unit 60 in FIG. 2 as a received signal from user A as being separated and extracted. Similarly, user B signal processing unit 50b supplies the received signal from user B as being separated and extracted to modem unit 60.

Reception weight vector calculator 52a uses an adaptive array algorithm such as RLS (Recursive Least Square) algorithm or SMI (Sample Matrix Inversion) algorithm.

Such RLS algorithm or SMI algorithm is a well-known technique in the field of adaptive array processing, which is described in detail in "Adaptive Signal Processing by Array Antenna" by Nobuyoshi Kikuma (Kagaku Gijutsu Shuppan,) chapter 3, MMSE Adaptive Array, pp 35 to 49, as described above, and therefore the description thereof will not be made here.

On the other hand, the transmitting signal from modem unit 60 in FIG. 5 is modulated by a transmitting signal modulation unit 53a and is applied through a transmission waveform shaping circuit 55a controlled with a signal from control unit 80 in FIG. 5 to respective one inputs of multipliers MT1, MT2, and the reception weights calculated in reception weight vector calculator 52a are copied and in some situations corrected in a transmission weight vector calculator 54a and then applied to the respective other inputs of multipliers MT1, MT2 as transmission weight vector.

In this manner, the digital transmitting signals in two streams that are weighted with complex multiplications by the transmission weight vectors in the respective user A signal processing unit 50a and user B signal processing unit 50b are combined and transmitted to radio units 21, 22, respectively.

The digital received signals provided to radio units 21, 22 are transmitted through antennas 11, 12, respectively.

Since the signals transmitted through the same antennas 11, 12 as in reception are weighted with the weight vector targeting a particular terminal in a manner similar to a received signal, a radio wave signal transmitted from these antennas is emitted with the transmission directivity targeting this particular terminal.

Here, control unit 80 shown in FIG. 5 detects a symbol timing for each frame of a transmission signal for each user based on the information from modem unit 60 and baseband processing and TDMA/TDD processing unit 70 and provides a signal for controlling a transmitting power waveform for each user to transmission waveform shaping circuit 55a in each user signal processing unit at the timing shown in FIGS. 1-4. In accordance with this signal, transmission waveform shaping circuit 55a varies the transmitting power of the corresponding terminal at the timing shown in FIGS. 1-4.

Figure 7:
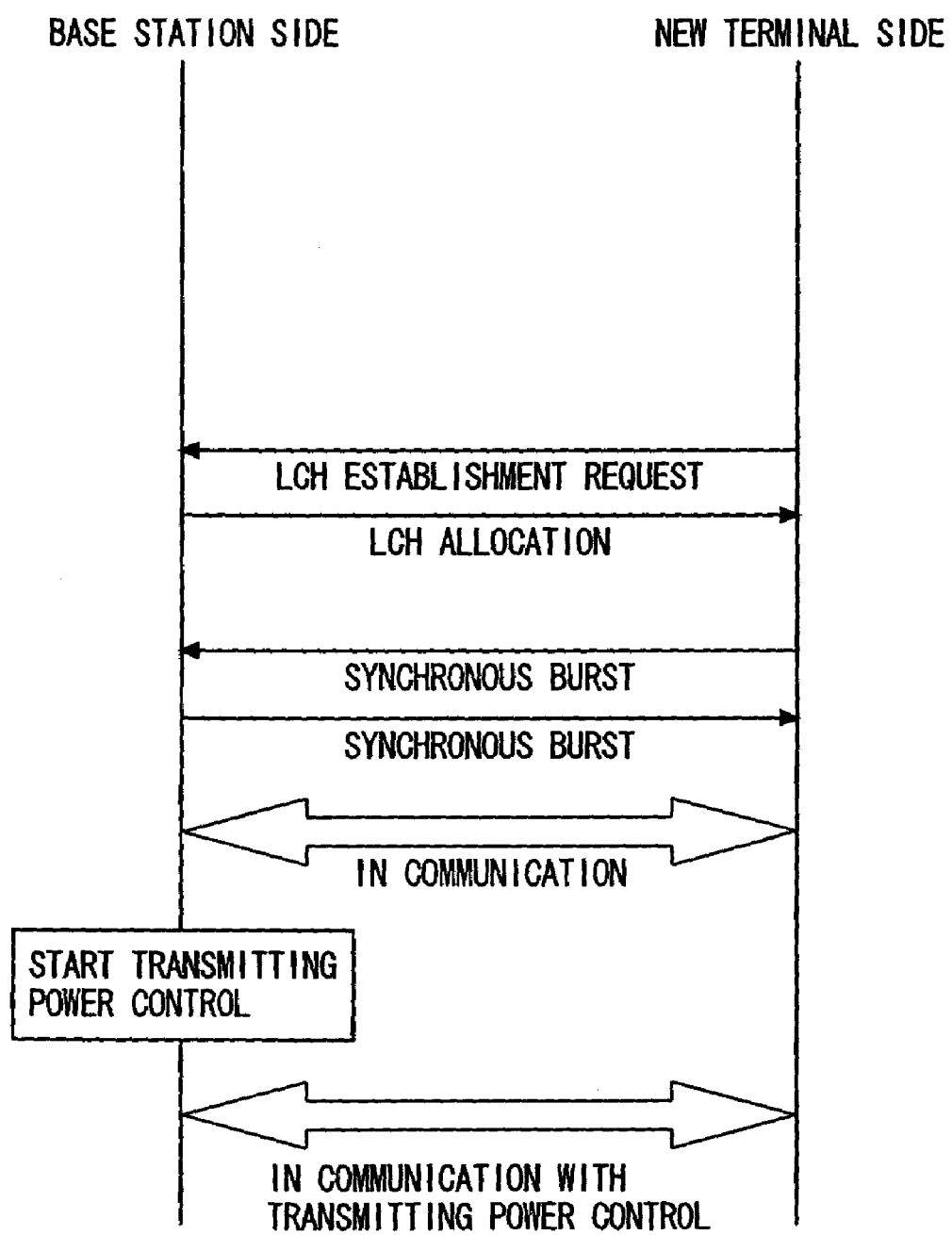
FIG. 7 is a timing chart showing a power control executing timing in accordance with an embodiment of the present invention.

FIG. 7 is a timing chart showing a power control executing timing in accordance with an embodiment of the present invention. More specifically, FIG. 7 shows signal communication between the adaptive array base station side and the terminal (whether it is a diversity terminal or not does not matter) side.

Referring to FIG. 7, a terminal attempting to establish new access to the base station makes a link channel LCH establishment request to the base station. In response, the base station carries out LCH allocation.

Next, an up-link synchronous burst signal is transmitted from the terminal side to the base station side, and in response a down-link synchronous burst signal is transmitted from the base station side to the terminal side.

After these procedures, a traffic channel is established between the terminal and the base station to allow a speech to be started.

Thereafter, at the base station side, transmitting power control as described with reference to FIGS. 1-4 is started. During the speech, the control of transmitting power waveform still continues for each frame of the down-link transmitting signal to each terminal at the timing as shown in FIGS. 1-4.

Figure 8:
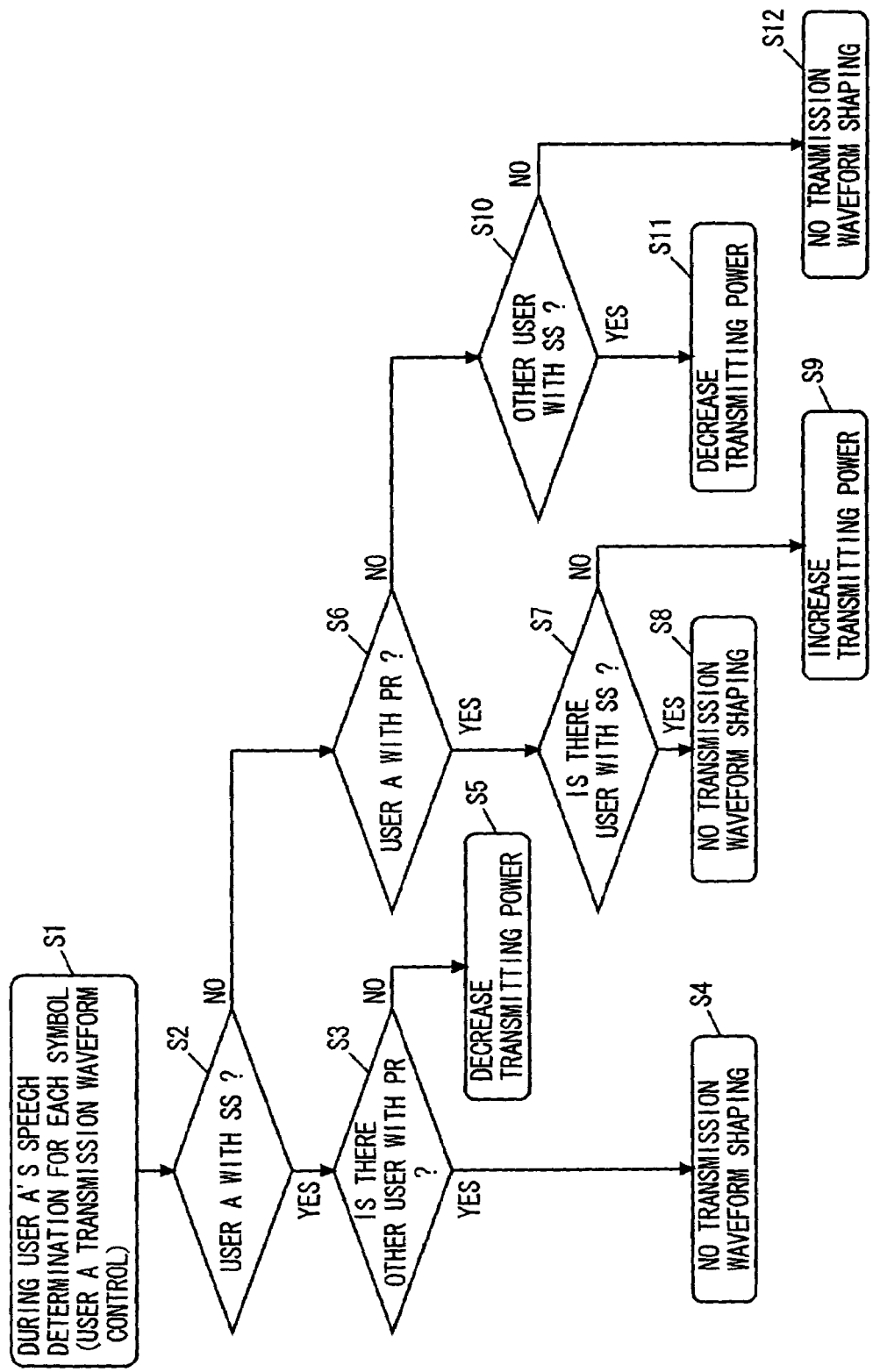
FIG. 8 is a flow chart showing a transmitting power control method in accordance with an embodiment of the present invention.
Figure 9:
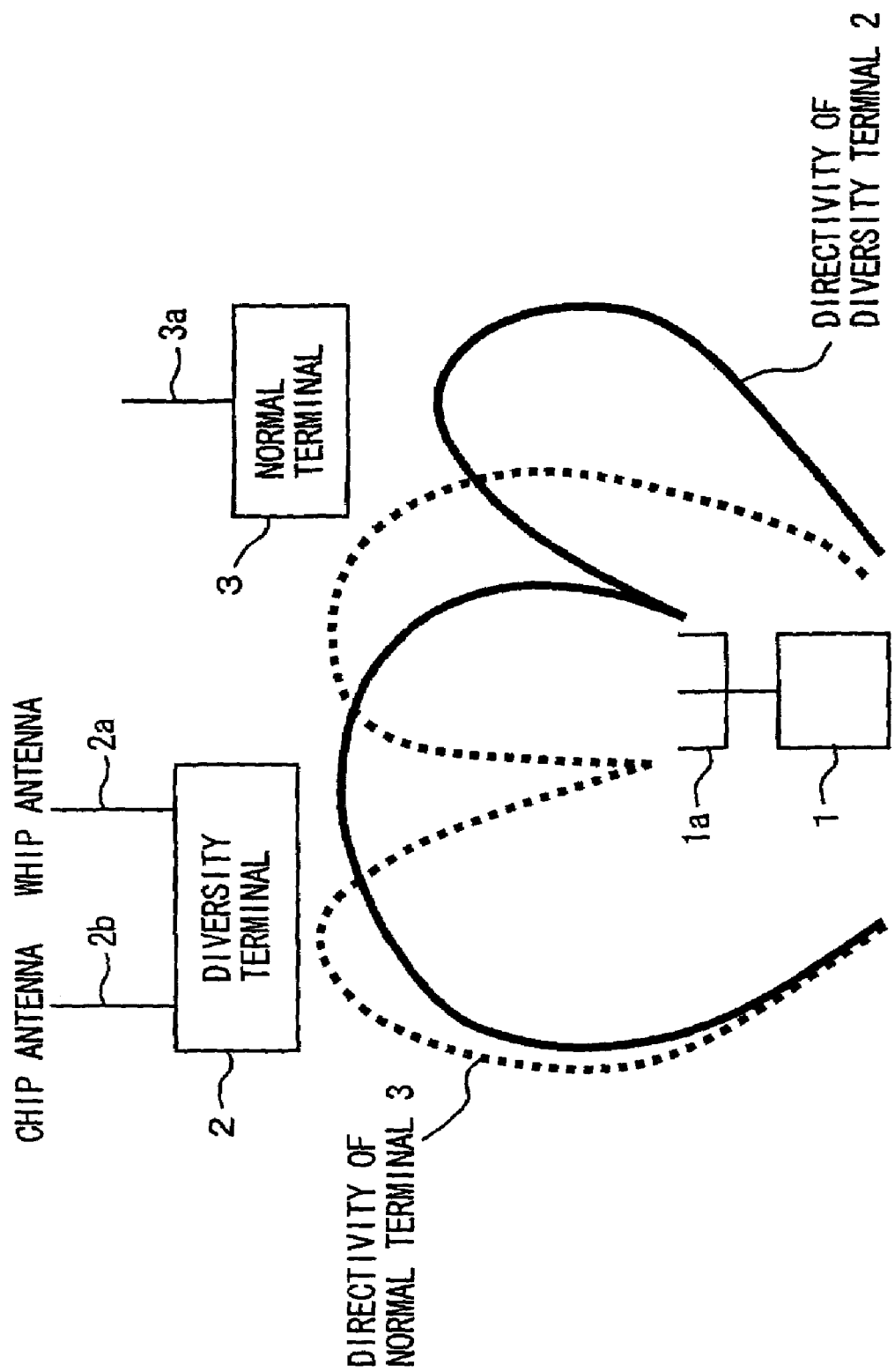
FIG. 9 is a conceptual diagram schematically showing a down-link transmission directivity of an adaptive array base station for a diversity terminal and a normal terminal.

FIG. 8 is a flow chart showing the transmitting power control method carried out by DSP unit (which corresponds to control unit 80 and user signal processing unit 50 in FIG. 5 (transmission waveform shaping circuit 55a in FIG. 6, in particular) in adaptive array base station 1000 in order to realize the transmitting power control method in accordance with the present invention shown in FIGS. 1-4.

Referring to FIG. 8, it is assumed that a plurality of users (user A and the other user) establish path division multiple access to the adaptive array base station. It is noted that whether each user is a diversity terminal or not does not matter.

First, in control unit 80 of the adaptive array base station, a symbol of each frame of a down-link transmitting signal to user A during speech is determined (step S1).

Then, if it is determined that the down-link transmitting signal to user A is at the timing of SS (step S2), it is determined whether there is no other user with the timing of PR (the second symbol) of the down-link transmitting signal (step S3).

If the presence of the other user at PR is determined, it follows that, as described in conjunction with FIG. 3, SS and PR (the second symbol) of the two users overlap, and shaping of transmitting power waveform (control to increase or decrease the power) is not performed at this timing (step S4).

On the other hand, if at step S3 it is determined that there is no other user with the timing of PR (the second symbol) of the down-link transmitting signal, the transmitting power waveform is controlled such that the transmitting power for user 1 is decreased at the timing of SS, for example, as in user 1 in FIG. 2 (step S5).

If at step S2 it is determined that the down-link transmitting signal for user A is not at the timing of SS, it is determined whether the down-link transmitting signal for user A is at the timing of PR (the second symbol) (step S6).

Then, if it is determined that the down-link transmitting signal for user A is at the timing of PR (the second symbol) (step S6), it is determined whether there is any other user with the timing of SS of the down-link transmitting signal (step S7).

If the presence of the other user at SS is determined, it follows that, as described in conjunction with FIG. 3, SS and PR (the second symbol) of the two users overlap, and shaping of transmitting power waveform (control to increase or decrease the power) is not performed at this timing (step S8).

On the other hand, if at step S7 it is determined that there is no other user with the timing of SS of the down-link transmitting signal, the transmitting power waveform is controlled such that the transmitting power for user 1 is increased at the timing of PR (the second symbol), for example, as in user 1 in FIG. 2 (step S9).

If at step S6 it is determined that the down-link transmitting signal for user A is not at the timing of PR (the second symbol), it is determined whether the down-link transmitting signal for the other user is at the timing of SS (step S10).

Provided that user A is not at the timing of SS (step S2) and not at the timing of PR (the second symbol) and if it is determined that there is any other user with the timing of SS of the down-link transmitting signal (step S10), the control is performed to decrease the transmitting power for user 2 at the timing of SS for user 1, as in FIG. 2 (step S11).

On the other hand, if the other user is not at the timing of SS, the control of transmitting power waveform is not performed (step S12).

Though not shown in FIG. 8, if the other user is not at the timing of SS and if it is further determined that the other user is at PR (the second symbol), the control may be performed such that the transmitting power for user 2 is increased at the timing of PR (the second symbol) for user 1, as in FIG. 2.

As described above, in accordance with the present invention, the down-link transmitting power waveform from the adaptive array base station is controlled in accordance with the down-link signal level measurement timing in the selective diversity operation in the diversity terminal so that that antenna of the diversity terminal which is used in transmission is more likely to be selected as a receiving antenna, thereby preventing deteriorated reception performance in the diversity terminal.

INDUSTRIAL APPLICABILITY

In accordance with the present invention, deteriorated reception performance of a diversity terminal is prevented by down-link transmitting power control, and therefore the present invention is effective in a mobile communication system where a selective diversity terminal communicates with a radio base apparatus.

The invention claimed is:

1. A radio base apparatus capable of communicating with a diversity terminal apparatus performing selective diversity reception, said diversity terminal apparatus having at least first and second antennas, always using said second antenna to transmit an up-link signal to said radio base apparatus, and measuring reception levels at said first antenna at a prescribed first timing and at said second antenna at a prescribed second timing of a down-link signal from said radio base apparatus to use an antenna with a higher reception level to receive a down-link signal from said radio base apparatus, said radio base apparatus comprising:

signal processing means for receiving and transmitting a signal from/to each of said plurality of terminal apparatuses through adaptive array processing; and transmitting power control means for controlling transmitting power for a terminal apparatus of said plurality of terminal apparatuses which communicates with said radio base apparatus such that transmitting power at said second timing of the down-link signal is larger than transmitting power at said first timing of the down-link signal.

2. The radio base apparatus according to claim 1, wherein said transmitting power control means controls transmitting power such that transmitting power at said first timing is decreased and transmitting power at said second timing is increased, of a down-link signal to a terminal communicating with said radio base apparatus.

3. The radio base apparatus according to claim 1, wherein said transmitting power control means controls transmitting power such that transmitting power at said first timing of a down-link signal to a terminal communicating with said radio base apparatus is decreased.

4. The radio base apparatus according to claim 1, wherein said transmitting power control means controls transmitting power such that transmitting power at said second timing of a down-link signal to a terminal communicating with said radio base apparatus is increased.

5. The radio base apparatus according to claim 1, wherein said transmitting power control means controls transmitting power such that when said first timing of a down-link signal to a first terminal communicating with said radio base apparatus overlaps said second timing of a down-link signal to a second terminal communicating with said radio base apparatus, transmitting power at said second timing of the down-link signal to said first terminal is increased and transmitting power at said first timing of the down-link signal to said second terminal is decreased.

6. The radio base apparatus according to claim 1, wherein said transmitting power control means controls transmitting power such that transmitting power of a down-link signal to a second terminal communicating with said radio base apparatus is decreased at said first timing of a down-link signal to a first terminal communicating with said radio base apparatus.

7. The radio base apparatus according to claim 1, wherein said transmitting power control means controls transmitting power such that transmitting power of a down-link signal to a second terminal communicating with said radio base apparatus is increased at said second timing of a down-link signal to a first terminal communicating with said radio base apparatus.

8. A transmitting power control method of a radio base apparatus capable of communicating with a diversity terminal apparatus performing selective diversity reception,
said diversity terminal apparatus having at least first and second antennas, always using said second antenna to transmit an up-link signal to said radio base apparatus, and measuring reception levels at said first antenna at a prescribed first timing and at said second antenna at a prescribed second timing of a down-link signal from said radio base apparatus to use an antenna with a higher reception level to receive a down-link signal from said radio base apparatus,
said transmitting power control method comprising the steps of:
receiving and transmitting a signal from/to each of said plurality of terminal apparatuses through adaptive array processing; and
controlling transmitting power for a terminal apparatus of said plurality of terminal apparatuses which communicates with said radio base apparatus such that transmitting power at said second timing of the down-link signal is larger than transmitting power at said first timing of the down-link signal.

9. The transmitting power control method according to claim 8, wherein
said step of controlling transmitting power includes a step of controlling transmitting power such that transmitting power at said first timing is decreased and transmitting power at said second timing is increased, of a down-link signal to a terminal communicating with said radio base apparatus.

10. The transmitting power control method according to claim 8, wherein
said step of controlling transmitting power includes a step of controlling transmitting power such that transmitting power at said first timing of a down-link signal to a terminal communicating with said radio base apparatus is decreased.

11. The transmitting power control method according to claim 8, wherein
said step of controlling transmitting power includes a step of controlling transmitting power such that transmitting power at said second timing of a down-link signal to a terminal communicating with said radio base apparatus is increased.

12. The transmitting power control method according to claim 8, wherein
said step of controlling transmitting power includes a step of controlling transmitting power such that when said first timing of a down-link signal to a first terminal communicating with said radio base apparatus overlaps said second timing of a down-link signal to a second terminal communicating with said radio base apparatus, transmitting power at said second timing of the down-link signal to said first terminal is increased and transmitting power at said first timing of the down-link signal to said second terminal is decreased.

13. The transmitting power control method according to claim 8, wherein
said step of controlling transmitting power includes a step of controlling transmitting power such that transmitting power of a down-link signal to a second terminal communicating with said radio base apparatus is decreased at said first timing of a down-link signal to a first terminal communicating with said radio base apparatus.

14. The transmitting power control method according to claim 8, wherein
said step of controlling transmitting power includes a step of controlling transmitting power such that transmitting power of a down-link signal to a second terminal communicating with said radio base apparatus is increased at said second timing of a down-link signal to a first terminal communicating with said radio base apparatus.

15. A transmitting power control program of a radio base apparatus capable of communicating with a diversity terminal apparatus performing selective diversity reception,
said diversity terminal apparatus having at least first and second antennas, always using said second antenna to transmit an up-link signal to said radio base apparatus, and measuring reception levels at said first antenna at a prescribed first timing and at said second antenna at a prescribed second timing of a down-link signal from said radio base apparatus to use an antenna with a higher reception level to receive a down-link signal from said radio base apparatus, wherein said transmitting power control program causes a computer to execute the steps of:

receiving and transmitting a signal from/to each of said plurality of terminal apparatuses through adaptive array processing; and controlling transmitting power for a terminal apparatus of said plurality of terminal apparatuses which communicates with said radio base apparatus such that transmitting power at said second timing of the down-link signal is larger than transmitting power at said first timing of the down-link signal.

16. The transmitting power control program according to claim 15, wherein said step of controlling transmitting power includes a step of controlling transmitting power such that transmitting power at said first timing is decreased and transmitting power at said second timing is increased, of a down-link signal to a terminal communicating with said radio base apparatus.

17. The transmitting power control program according to claim 15, wherein said step of controlling transmitting power includes a step of controlling transmitting power such that transmitting power at said first timing of a down-link signal to a terminal communicating with said radio base apparatus is decreased.

18. The transmitting power control program according to claim 15, wherein said step of controlling transmitting power includes a step of controlling transmitting power such that transmitting power at said second timing of a down-link signal to a terminal communicating with said radio base apparatus is increased.

19. The transmitting power control program according to claim 15, wherein said step of controlling transmitting power includes a step of controlling transmitting power such that when said first timing of a down-link signal to a first terminal communicating with said radio base apparatus overlaps said second timing of a down-link signal to a second terminal communicating with said radio base apparatus, transmitting power at said second timing of the down-link signal to said first terminal is increased and transmitting power at said first timing of the down-link signal to said second terminal is decreased.

20. The transmitting power control program according to claim 15, wherein said step of controlling transmitting power includes a step of controlling transmitting power such that transmitting power of a down-link signal to a second terminal communicating with said radio base apparatus is decreased at said first timing of a down-link signal to a first terminal communicating with said radio base apparatus.

21. The transmitting power control program according to claim 15, wherein said step of controlling transmitting power includes a step of controlling transmitting power such that transmitting power of a down-link signal to a second terminal communicating with said radio base apparatus is increased at said second timing of a down-link signal to a first terminal communicating with said radio base apparatus.

* * * * *